US008826353B2

(12) United States Patent
Takahashi

(10) Patent No.: US 8,826,353 B2
(45) Date of Patent: Sep. 2, 2014

(54) CONNECTION SETTING METHOD, CAMERA SYSTEM, AND RECORDING MEDIUM

(75) Inventor: Hiroaki Takahashi, Kanagawa (JP)

(73) Assignee: Sony Corporation, Tokyo (JP)

(*) Notice: Subject to any disclaimer, the term of this patent is extended or adjusted under 35 U.S.C. 154(b) by 250 days.

(21) Appl. No.: 13/164,028

(22) Filed: Jun. 20, 2011

(65) Prior Publication Data

US 2011/0317021 A1    Dec. 29, 2011

(30) Foreign Application Priority Data

Jun. 24, 2010 (JP) ................. P2010-144147

(51) Int. Cl.
H04N 7/173    (2011.01)

(52) U.S. Cl.
USPC ............... 725/105; 348/211.9; 348/211.1

(58) Field of Classification Search
CPC ............ H04N 7/17318; H04N 5/23206
USPC .................. 348/207.1; 725/105
See application file for complete search history.

(56) References Cited

U.S. PATENT DOCUMENTS 7,729,250 B2 * 6/2010 Matoba ............. 370/230.1
7,978,224 B2 * 7/2011 Dobrin ............. 348/211.11
2002/0067254 A1 * 6/2002 Ebata et al. ............. 340/506
2004/0257469 A1   12/2004 Compton et al.
2006/0239293 A1 * 10/2006 Vasil'evich et al. .......... 370/445
2009/0097483 A1 *  4/2009 Henocq et al. ............. 370/389
2010/0165846 A1 *  7/2010 Yamaguchi et al. .......... 370/236
2010/0304731 A1 * 12/2010 Bratton et al. ............. 455/420
2011/0252265 A1 * 10/2011 Iwami et al. ............. 713/401

FOREIGN PATENT DOCUMENTS

JP        9-238277       9/1997
WO    WO 2008035600 A1 *  3/2008 ............. H04L 12/56

* cited by examiner

Primary Examiner — Roberto Velez
Assistant Examiner — Cynthia Segura
(74) Attorney, Agent, or Firm — Frommer Lawrence & Haug LLP; William S. Frommer

(57) ABSTRACT

A connection setting method, used in a camera system in which at least one camera head unit is connected to at least one camera control unit that controls the camera head unit via a single transmission network in order to connect the camera control unit includes: measuring delay of image data from the camera head unit to be connected; and determining a transmission rate at which image data is transmitted from the camera head unit to be connected. The determining is so carried out that when the delay is greater than a threshold corresponding to the amount of data smaller than or equal to a maximum amount of transmission over the network, the sum of the transmission rates at which image data transmitted over the network is smaller than or equal to the maximum amount of transmission over the network and image data having a higher preset priority is transmitted at a higher transmission rate.

7 Claims, 11 Drawing Sheets

CAMERA SYSTEM (1) OF RELATED ART

CAMERA SYSTEM (2) OF RELATED ART

CAMERA SYSTEM (1) IN EMBODIMENT OF PRESENT DISCLOSURE

CONFIGURATION OF CHU

CONFIGURATION OF CCU

CAMERA SYSTEM (2) IN PRESENT EMBODIMENT

FUNCTIONAL CONFIGURATION OF CPU IN CHU

FUNCTIONAL CONFIGURATION OF CPU IN CCU

CAMERA SYSTEM IN ANOTHER EMBODIMENT

SYSTEM DELAY NEGOTIATION PROCEDURE IN ANOTHER EMBODIMENT

CONNECTION SETTING METHOD, CAMERA SYSTEM, AND RECORDING MEDIUM

FIELD

The present disclosure relates to a connection setting method, a camera system, and a recording medium, and is preferably applicable to a camera system used, for example, in a studio in a TV station.

BACKGROUND

FIG. 1 shows a camera system 1 of related art including a plurality of camera head units (hereinafter also referred to as CHUs) 2 that capture video images, camera control units (hereinafter also referred to as CCUs) 3, a video switcher 4, and a standard signal generator 5, and the CHUs 2 are connected to the CCUs 3 via camera cables 6 in a one-to-one relationship (see JP-A-9-238277, for example).

FIG. 2 shows another camera system having been proposed, a camera system 10 including CHUs 2 connected to CCUs 3 via an asynchronous communication network 11, such as Ethernet®/IP (see JP-A-2004-304809, for example).

SUMMARY

In the camera system 10 described above, since the CHUs 2 are connected to the CCUs 3 via the asynchronous communication network 11, the CHUs 2 set IP addresses of the CCUs 3 and vice versa.

To this end, the camera system 10 forces a user to do the following cumbersome manual jobs: A personal computer (PC) or any other suitable apparatus is connected to the CHUs 2 and the CCUs 3, and software or other suitable means executed by a CPU built in each of the cameras is used to set an IP address of the CHU 2 or the CCU 3 itself, an IP address of the connection counterpart, and other settings on a console screen of the CHU 2 or the CCU 3.

Further, the entire camera system 10 may not function properly when wrong settings are inputted or due to other human errors.

Thus, it is desirable to provide a connection setting method used in a camera system in which a plurality of image data sets are transmitted over a single transmission network and allowing an optimum connection setting to be determined in accordance with the transmission network. It is also desirable to propose the camera system itself and a recording medium.

According to an embodiment of the present disclosure, there is provided a connection setting method used in a camera system in which at least one camera head unit is connected to at least one camera control unit that controls the camera head unit via a single transmission network in order to connect the camera control unit, the method including a measurement step of measuring delay of image data transmitted from the camera head unit to be connected and a transmission rate determination step of determining a transmission rate at which image data is transmitted from the camera head unit to be connected. The transmission rate determination step is so carried out that when the delay measured in the measurement step is greater than a threshold corresponding to the amount of data smaller than or equal to a maximum amount of transmission over the transmission network, the sum of the transmission rates at which image data transmitted over the transmission network is smaller than or equal to the maximum amount of transmission over the transmission network and image data having a higher preset priority is transmitted at a higher transmission rate.

According to another embodiment of the present disclosure, there is provided a camera system in which at least one camera head unit is connected to at least one camera control unit that controls the camera head unit via a single transmission network. The camera head unit includes an image capturing section that acquires image data, an encoding section that encodes the image data at a predetermined compression rate, and a transmitting section that transmits the encoded image data to the camera control unit. The camera control unit includes a transmission rate determining section that measures delay of image data transmitted from the camera head unit and determines a transmission rate at which image data is transmitted from the camera head unit to be connected, and the transmission rate is so determined that when the measured delay is greater than a threshold corresponding to the amount of data smaller than or equal to a maximum amount of transmission over the transmission network, the sum of the transmission rates at which image data transmitted over the transmission network is smaller than or equal to the maximum amount of transmission over the transmission network and image data having a higher preset priority is transmitted at a higher transmission rate.

According to still another embodiment of the present disclosure, there is provided a recording medium used in a camera system in which at least one camera head unit is connected to at least one camera control unit that controls the camera bead unit via a single transmission network. The recording medium stores identifiers that allow the camera head unit and the camera control unit to identify respective connection counterparts and priorities for determining a transmission rate ac which image data is transmitted from the camera head unit. The transmission rate is so determined that when delay of image data transmitted from the camera head unit to the camera control unit is greater than a threshold corresponding to the amount of data smaller than or equal to a maximum amount of transmission over the transmission network, the sum of the transmission rates at which image data transmitted over the transmission network is smaller than or equal to the maximum amount of transmission over the transmission network and the transmission rate becomes higher in accordance with the priorities.

As described above, in a system in which a plurality of image data sets are transmitted over a single transmission network, a transmission rate at which the image data sets are transmitted can be determined in accordance with priorities of the image data sets in such a way that the sum of the transmission rates at which the plurality of image data sets are transmitted is smaller than or equal to a maximum amount of transmission over the transmission network.

According to the embodiments of the present disclosure described above, in a system in which a plurality of image data sets are transmitted over a single transmission network, the amounts of transmission of the image data sets can be determined in accordance with priorities of the image data sets in such a way that the sum of transmission rates at which the plurality of image data sets are transmitted is smaller than or equal to a maximum amount of transmission over the transmission network. Therefore, in the camera system, even when a plurality of image data sets are transmitted via the single transmission network, an optimum connection setting can be determined in accordance with the transmission network.

DETAILED DESCRIPTION

Embodiments for carrying out the present disclosure will be described below. The description will be made in the following order.

1. Embodiment
2. Other Embodiments

<1. Embodiment>

[1. Configuration of camera System]

Figure 1:
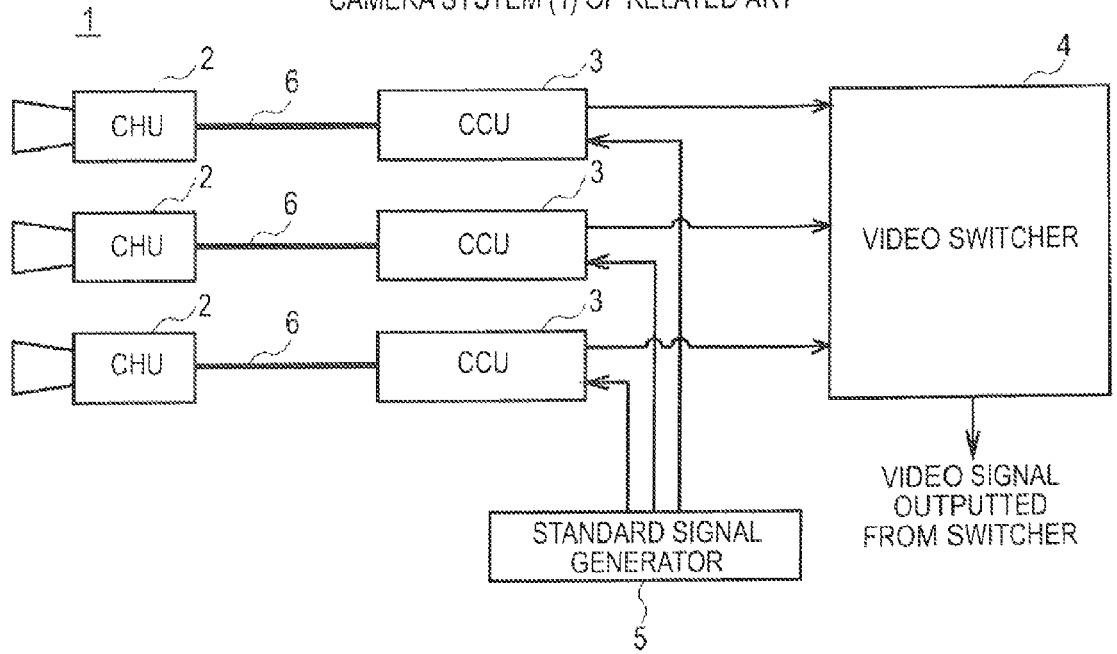
FIG. 1 is a schematic diagram showing a camera system (1) of related art.
Figure 2:
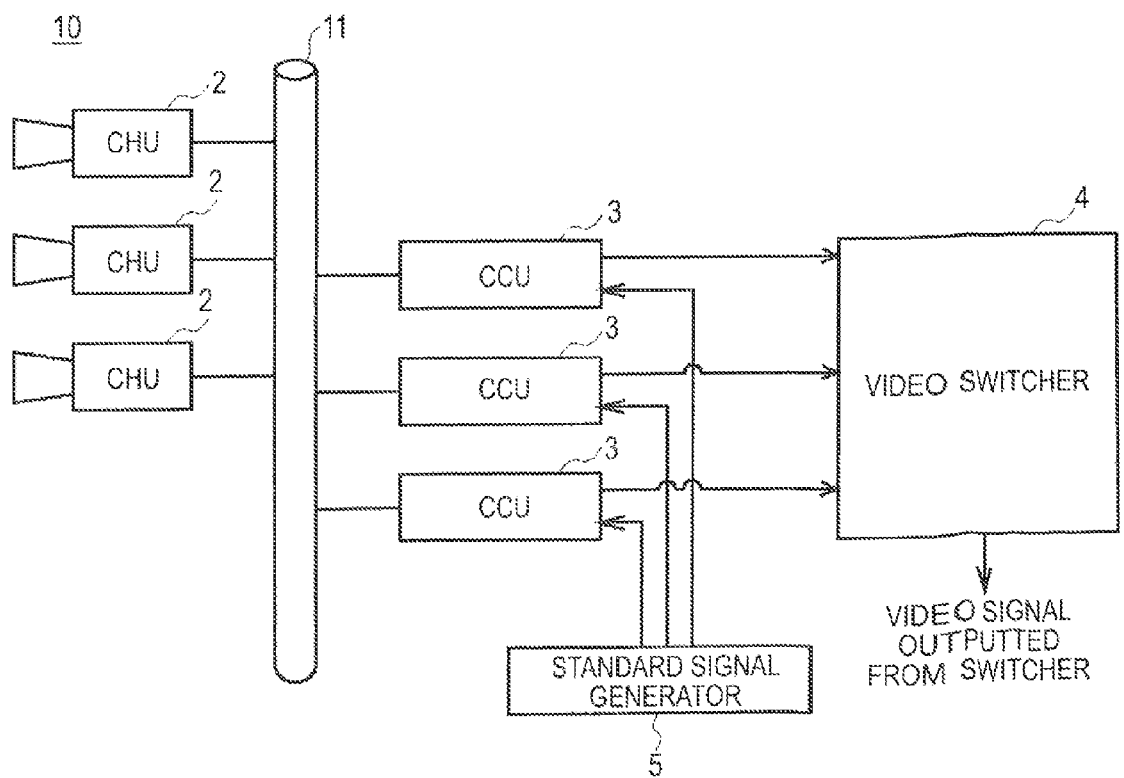
FIG. 2 is a schematic diagram showing a camera system (2) of related art.
Figure 3:
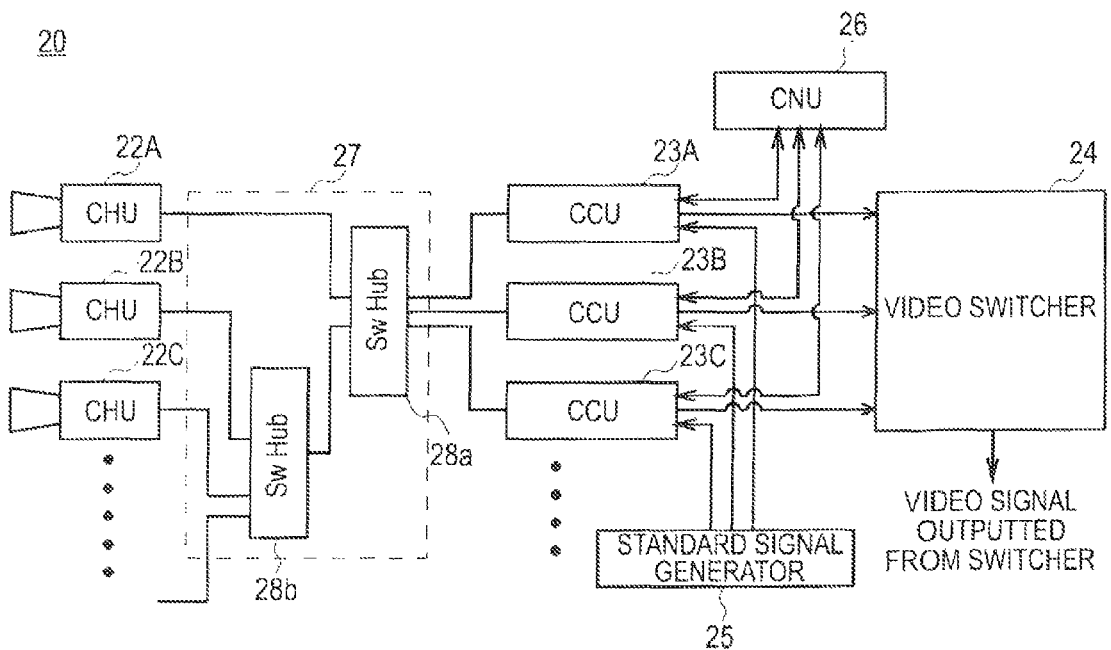
FIG. 3 is a schematic diagram showing a camera system (1) in an embodiment of the present disclosure.

FIG. 3 shows a camera system 20 according to an embodiment of the present disclosure. The camera system 20 includes a plurality of CHUs 22 (22A, 22B, 22C, and so on), a plurality of CCUs 23 (23A, 23B, 23C, and so on), a video switcher 24, a standard signal generator 25, and a camera command network unit (hereinafter also referred to as CNU) 26.

The following description will be made of a case where three CHUs 22 and three CCUs 23 are provided for ease of description. When the description is made without particularly distinguishing the CHUs 22A, 22B, and 22C from one another, they are simply called CHUs 22. Similarly, when the description is made without particularly distinguishing the CCUs 23A, 23B, and 23C from one another, they are simply called CCUs 23.

In the camera system 20, the CHU 22A and the CCU 23A, the CHU 22B and the CCU 23B, and the CHU 22C and the CCU 23C are connected to each other in a one-to-one relationship via an asynchronous communication network 27, which is Ethernet®/IP, including switching hubs 28a and 28b.

Video image data captured with the CHUs 22 are transmitted over the asynchronous communication network 27 to the CCUs 23, which are connection counterparts, and outputted from the CCUs 23 to the video switcher 24.

The video switcher 24 selects video image data from those supplied from the CCUs 23, for example, in accordance with user's operation and outputs the selected video image data to an external apparatus. The video switcher 24 further outputs return video image data for displaying video images on displays (not shown) of the CHUs 22 via the CCUs 23 to the CHUs 22.

The standard signal generator 25 sends a standard signal, which is a reference for establishing system clock synchronization in each CHU 22-CCU 23 pair, to the CCUs 23.

The CNU 26 is configured to be a computer including a CPU (central processing unit), a ROM (read only memory), and a RAM (random access memory) and adjusts communication delay produced in each CHU 22-CCU 23 pair, as will be described later in detail.

[1-1. Configuration of CHU]

Figure 4:
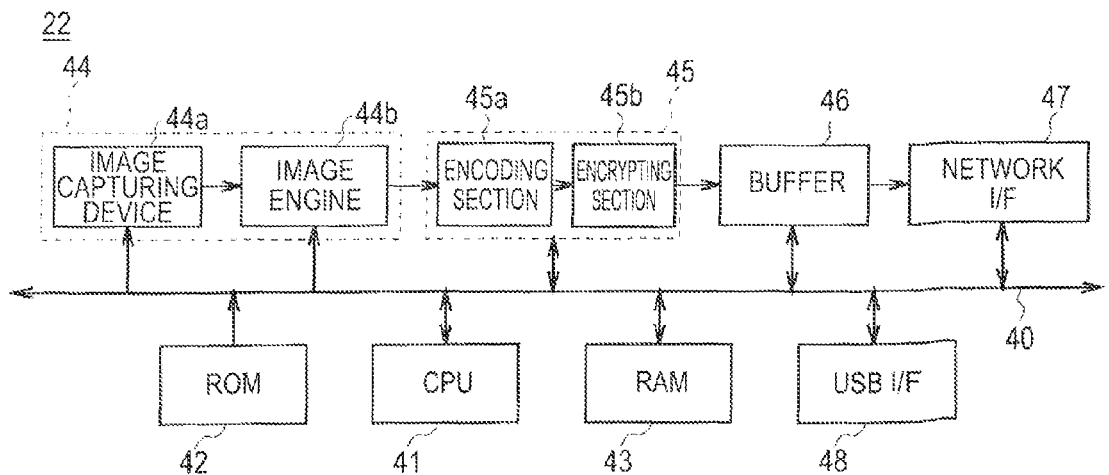
FIG. 4 is a schematic diagram showing the configuration of a CHU.

A CHU 22 includes a CPU 41, a ROM 42 that stores a variety of programs, and a RAM 43 that functions as a work memory used by the CPU, as shown in FIG. 4.

A CHU 22 further includes an image capturing section 44 formed of an image capturing device 44a and an image engine 44b, an encoder 45, a buffer 46, a network interface 47, and a USB (universal serial bus) interface 48, which are connected to each other via a bus 40. The encoder 45 functions as an encoding section 45a and an encrypting section 45b.

The CPU 41, which oversees the entire CHU 22, loads the variety of programs stored in the ROM 42 into the RAM 43 and executes them.

The image capturing device 44a may be, for example, a CCD (charge coupled device) or a CMOS (complementary metal oxide semiconductor) device. The image engine 44b converts electric charge accumulated in the image capturing device 44a into video image data.

The encoding section 45a in the encoder 45 compression-encodes the video image data captured with the image capturing section 44 at a preset compression rate. The encrypting section 45b encrypts the encoded video image data by using a predetermined encryption key.

The buffer 46 is, for example, a nonvolatile memory and a storage area for temporarily storing the video image data having been compression-encoded and encrypted by the encoder 45. Alternatively, the buffer 46 may not be a separate nonvolatile memory. For example, part of the RAM 43 may be used as a buffer.

The network interface 47 is connected to the asynchronous communication network 27 (FIG. 3), which has an acceptable throughput (maximum amount of transmission) of 500 [Mbps] or any other value, via a LAN (local area network) cable and sends and receives a variety of data to and from the connection counterpart CCU 23.

The USB interface 48 is a USB-compliant interface, and a USB memory any other suitable memory can be connected thereto.

[1-2. Configuration of CCU]

Figure 5:
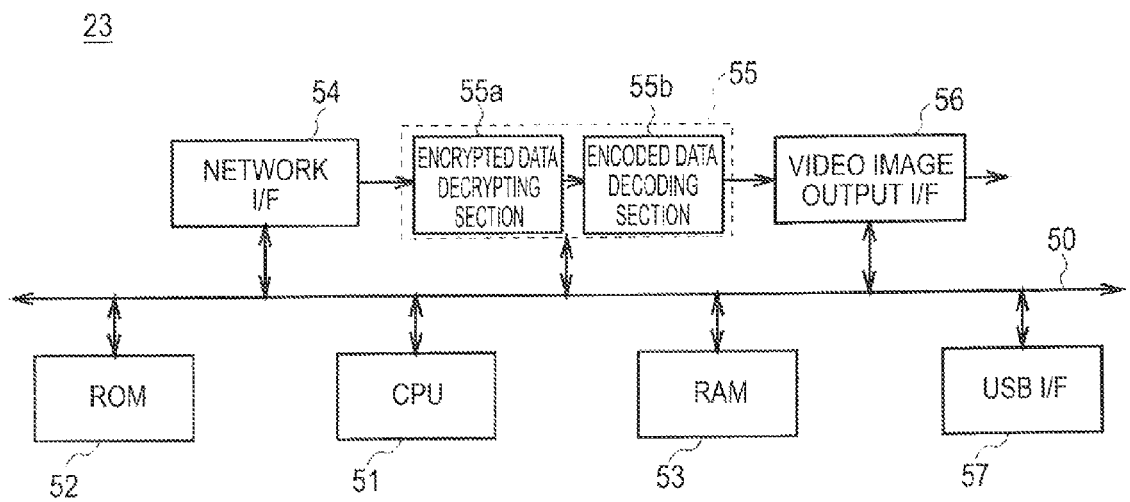
FIG. 5 is a schematic diagram showing the configuration of a CCU.

A CCU 23 includes a CPU 51, a ROM 52, a RAN 53, a network interface 54, a decoder 55, a video image output interface 56, and a UPS interface 57, which are connected to each other via a bus 50, as shown in FIG. 5. The decoder 55 functions as an encrypted data decrypting section 55a and an encoded data decoding section 55b.

The CPU 51, which oversees the entire CCU 23, loads a variety of programs stored in the ROM 52 into the RAM 53, which functions as a work memory, and executes them.

The network interface 54 is connected to the asynchronous communication network 27 via a LAN cable and sends and receives a variety of data to and from the connection counterpart CHU 22 over the asynchronous communication network 27.

The encrypted data decrypting section 55a in the decoder 55 decrypts the compression-encoded, encrypted video image data supplied from the CHU 22 by using a decryption key corresponding to the encryption key used to encrypt the video image data in the CHU 22 to produce compression-encoded video image data. The encoded data decoding section 55b decodes the compression-encoded video image data to produce video image data.

The video image output interface 56, which is connected to the video switcher 24 via a predetermined cable, sends the video image data to the video switcher 24 and receives return video image data supplied from the video switcher 24.

The USB interface 57 is a USB-compliant interface, and a USB memory or any other suitable memory can be connected thereto.

[1-3. Configuration of Dongle]

Figure 6:
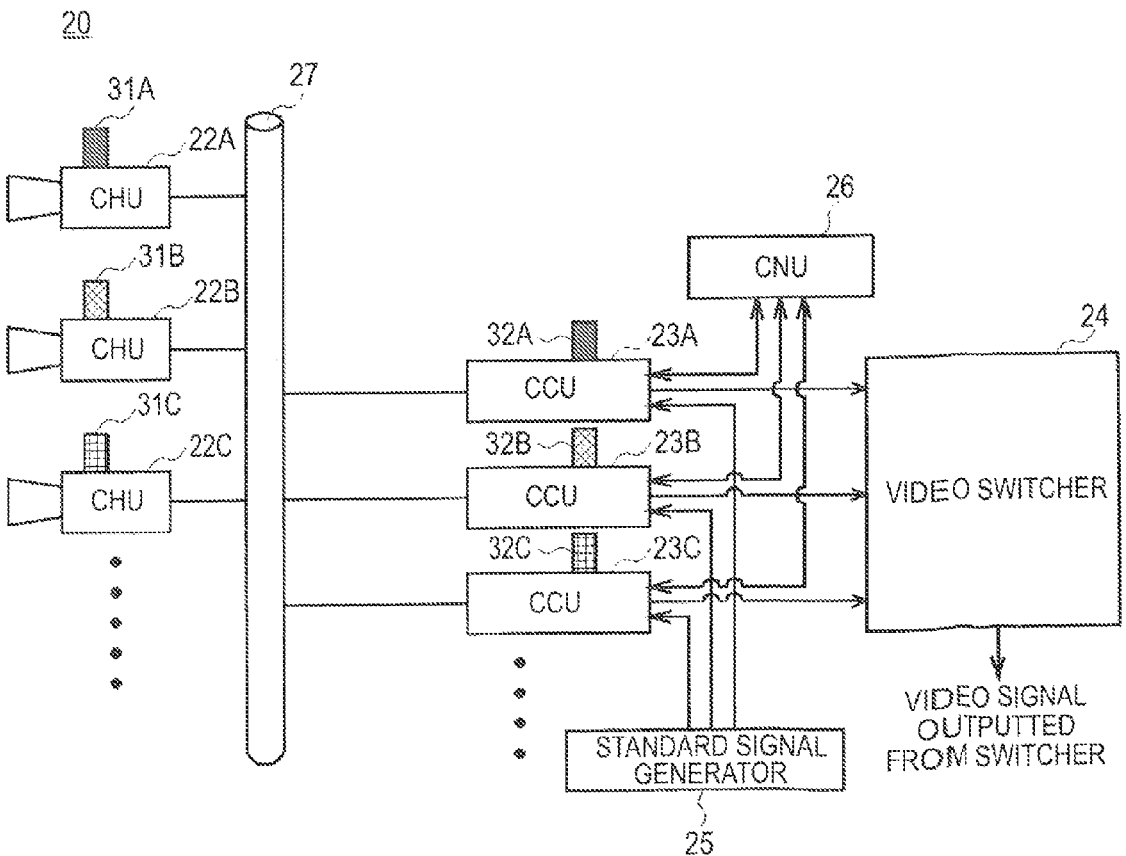
FIG. 6 is a schematic diagram showing a camera system (2) of the present embodiment.

A CHU 22 and a CCU 23 are so configured that a pair of dongles, a master dongle 31 and a slave dongle 32, each of which is a USB memory or any other suitable memory, are attached to the USB interfaces 48 and 57, respectively, as shown in FIG. 6. In FIG. 6, a master dongle 31A and a slave dongle 32A, a master dongle 31B and a slave dongle 32B, and a master dongle 31C and a slave dongle 32C are paired with each other. It is noted that the asynchronous communication network 27 is not shown in FIG. 6 for ease of illustration. The dongle used herein is, for example, small hardware including a storage medium that specifically stores the following information.

For example, a master dongle 31 (31A, 31B, 31C) stores data formed of an own IP address, a connection counterpart IP address, a port number, a transmission rate, an encryption key, transmission path information, and bandwidth reservation information.

The own IP address is an IP address of the CHU 22 to which the master dongle 31 is attached. The connection counterpart IP address is an IP address of the CCU 23 to which the slave dongle 32 paired with the mother dongle 31 is attached. The port number is used to send and receive video image data, audio data, and other information.

The transmission rate is an initially set transmission rate (300 [Mbps] in the present embodiment) at which the CHU 22 to which the master dongle 31 is attached transmits video image data to the connection counterpart CCU 23. The encryption key is used to transmit video image data only between the CHU 22 to which the master dongle 31 is attached and the CCU 23 to which the slave dongle 32 paired with the master dongle 31 is attached. The transmission path information represents the connection path in the asynchronous communication network 27 along which the CHU 22 to which the master dongle 31 is attached is connected to the CCU 23 to which the slave dongle 32 paired with the master dongle 31 is attached.

The bandwidth reservation information represents the priority of a CHU 22-CCU 23 pair in the camera system 20. For example, "high," which means the highest priority, is given to the master dongle 31A, "intermediate," which means an intermediate priority, is given to the master dongle 31B, and "low," which means the lowest priority, is given to the master dongle 31C.

Similarly, a daughter dongle 32 (32A, 32B, 32C) stores data formed of an own IP address (IP address of the CCU 23 to which the slave dongle 32 is attached), a connection counterpart IP address (IP address of the connection counterpart CHU 22) a port number, a decryption key, transmission path information, bandwidth reservation information, acceptable delay, and set delay.

The acceptable delay represents delay that can be accepted when video image data is supplied from the CHU 22 and corresponds, for example, to one-field-length video image data. The set delay is delay set and stored in a connection environment setting process, which will be described later.

[2. Connection Environment Setting Process]

A description will next be made of a process of setting a connection environment in which the CHUs 22 are connected to the CCUs 23 in the camera system 20 (hereinafter referred to as a connection environment setting process). The connection environment setting process is carried out after the components in the camera system 20 are powered and completed when the CCUs 23 are ready to receive video image data from the CHUs 22.

Figure 7:
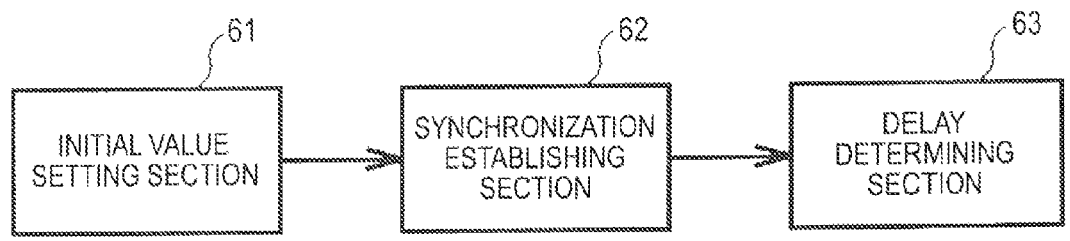
FIG. 7 is a schematic diagram showing the functional configuration of a CPU in the CHU.

The CPU 41 in a CHU 22 functions as an initial value setting section 61, a synchronization establishing section 62, and a delay determining section 63 in the connection environment setting process, as shown in FIG. 7.

Figure 8:
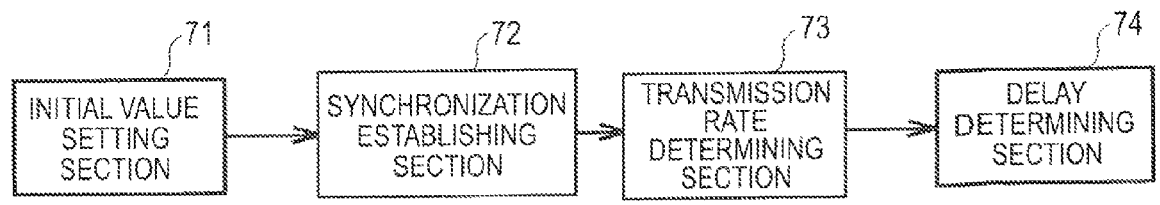
FIG. 8 is a schematic diagram showing the functional configuration of a CPU in the CCU.

The CPU 51 in a CCU 23 functions as an initial value setting section 71, a synchronization establishing section 72, a transmission rate determining section 73, and a delay determining section 74 in the connection environment setting process, as shown in FIG. 8.

[2-1. Initial Value Setting Process]

When the components in the camera system 20 are powered, the initial value setting section 61 in a CHU 22 reads data stored in the master dongle 31 inserted into the USB interface 48 of the CHU 22 and sets an own IP address and a port to be used to communicate with the connection counterpart CCU 23 based on the read data The initial value setting section 61 further reads data stored in the master dongle 31 and sets an IP address and a port of the connection counterpart CCU 23 to which the slave dongle 32 paired with the master dongle 31 is attached.

After the IP addresses and the ports are set, the initial value setting section 61 starts connecting the CHU 22 to the connection counterpart CCU 23 and searches a connection path to the CCU 23 in the asynchronous communication network 27.

The initial value setting section 61 compares the searched connection path with a connection path based on the transmission path information stored in the master dongle 31.

When the searched connection path differs from the connection path based on the transmission path information stored in the master dongle 31, the camera system 20 malfunctions, for example, any of the hubs 28 used as a connection path in the asynchronous communication network 27 malfunctions.

When the searched connection path differs from the connection path based on the transmission path information stored in the master dongle 31, the initial value setting section 61 notifies the user that the searched connection loath differs from the connection path stored in the master dongle 31 by displaying the fact described above on a display (not shown). In this way, the user is notified that any of the components in the camera system 20 malfunctions.

On the other hand, the initial value setting section 71 in a CCU 23 reads data stored in the slave dongle 32 inserted into the USB interface 57 of the CCU 23 and sets an own IP address and a port to be used to communicate with the connection counterpart CHU 22 used on the read data. The initial value setting section 71 further reads data stored in the slave dongle 32 and sets an IP address and a port of the connection counterpart CHU 22 to which the master dongle 31 paired with the slave dongle 32 is attached.

After the IP addresses and the ports are set, the initial value setting section 71 starts connecting the CCU 23 to the connection counterpart CHU 22 and searches a connection path to the CHU 22 in the asynchronous communication network 27.

The initial value setting section 71 compares the searched connection path with a connection path based on the transmission path information stored in the slave dongle 32. When the connection oaths differ from each other, the initial value setting section 71 notifies the user that the searched connection path differs from the connection path stored in the slave dongle 32.

The initial value setting section 71 further notifies the video switcher 24 that the searched connection path differs from the connection path stored in the slave dongle 32, and the video switcher 24 displays the fact on a display (not shown) of the video switcher 24 so that the user is notified of the fact. In this way, the initial value setting section 71 can also notify the user that any of the components in the camera system 20 malfunctions.

When the initial value setting sections 61 and 71 show that the searched connection paths are identical to the connection paths based on the transmission path information stored in the master dongle 31 and the slave dongle 32, the following processes are carried out.

[2-2. System Clock Synchronization Process]

A CHU 22-CCU 23 pair establishes system clock synchronization, for example, by using a method based on IEEE 1588 or the method described in JP-A-2004-304809.

Specifically, the synchronization establishing section 72 in a CCU 23 sends a synchronization packet based on the standard signal supplied from the standard signal generator 25 to the connection counterpart CHU 22. The synchronization establishing section 62 in the CHU 22, when it receives the synchronization packet, sends a response synchronization packet to the CCU 23 in response to the synchronization signal.

The synchronization establishing section 72 in the CCU 23 measures the time when the synchronization packet was sent and the time when the response synchronization packet was received and calculates communication delay produced in the CHU 22-CCU 23 pair over the asynchronous communication network 27. The synchronization establishing section 72 then establishes system clock synchronization between the CHU 22 and the CCU 23 based on the measured communication delay.

[2-3. Transmission Rate Determining Process]

When the system clock synchronization is established, a CHU 22-CCU 23 pair carries out a transmission rate determining process of determining a transmission rate at which video image data are transmitted from the CHU 22 to the CCU 23.

In the camera system 20, the CHUs 22A, 22B, and 22C transmit video image data to the connection counterpart CCUs 23A, 23B, and 23C, respectively, over the same transmission network, which is the asynchronous communication network 27.

When all the CHUs 22A, 22B, and 22C transmit video image data at 300 [Mbps], which is the transmission rate stored in the master dongles 31, the data are supplied to the asynchronous communication network 27 at a transmission rate higher than 500 [Mbps], which is the acceptable throughput of the asynchronous communication network 27.

In this case, the video image data transmitted from the CHUs 22 to the CCUs 23 are subjected to delay and jitter in the asynchronous communication network 27, and the CHUs 22 typically cannot send and receive video image data to and from the CCUs 23 in a stable manner.

To address the problem, the transmission rates are so determined that a CHU 22-CCU 23 pair having a higher priority can transmit video image data at a higher transmission rate under the condition that the sum of the transmission rates at which the CHUs 22 transmit video image data to the CCUs 23 is not higher than the acceptable throughput of the asynchronous communication network 27.

Specifically, in a CHU 22, the encoding section 45a compression-encodes video image data captured with the image capturing section 44 at a compression rate corresponding to the transmission rate stored in the master dongle 31, and the encrypting section 45b encrypts the encoded video image data. The CHU 22 then transmits the encrypted video image data for testing purposes to the connection counterpart CCU 23 via the network interface 47.

The transmission rate determining section 73 in the CCU 23, after the connection counterpart CHU 22 transmits the test video image data, measures transmission delay and jitter of the test video image data for five seconds or any other suitable period.

The transmission rate determining section 73 in the CCU 23 compares the measured transmission delay and jitter of the test video image data with thresholds corresponding to the amount of data smaller than or equal to the acceptable throughput over the asynchronous communication network 27.

When the transmission delay and jitter of the received test video image data are greater than the thresholds, the transmission rate determining section 73 lowers the transmission rate in accordance with the priority stored in the slave dongles 32. In the following description, the transmission rate determining sections 73 in the CCUs 23A, 23B, and 23C are called transmission rate determining sections 73A, 73B, and 73C, respectively, for ease of description.

Specifically, when the transmission delay and jitter of the received test video image data are greater than the thresholds, the transmission rate determining section 73C in the CCU 23C, to which the "low" priority has been given, waits five seconds and determines to lower the transmission rate by one step (50 [Mbps], for example).

The transmission rate determining section 73C then calculates a video image data compression rate corresponding to the one-step lower transmission rate (250 [Mbps]) and notifies the CHU 22C of the calculated compression rate so that the CHU 22C transmits again the test video image data at the one-step-lower transmission rate.

The transmission rate determining section 73C measures the transmission delay and jitter of the test video image data transmitted again from the CHU 22C and repeatedly carries out the processes described above to lower the transmission rate by one step at a time until the transmission delay and jitter become smaller than or equal to the thresholds.

In the case of the CHU 22C-CCU 23C pair, to which the lowest priority has been given, when the transmission delay and jitter measured for five seconds are greater than the thresholds, the transmission rate is lowered by one step after another five seconds has elapsed. That is, in the case of the CHU 22C-CCU 23C pair, to which the lowest priority has been given, when the transmission delay and jitter are greater than the thresholds, the transmission rate is lowered by one step every ten seconds.

On the other hand, when the transmission delay and jitter of the received test video image data are greater than the thresholds, the transmission rate determining section 73B in the CCU 23B, to which the "intermediate" priority has been given, waits ten seconds or any other suitable period and measures the transmission delay and jitter of the test video image data again for five second.

The transmission rate determining section 73B compares the transmission delay and jitter measured again with the thresholds. When the transmission delay and jitter are still greater than the thresholds, the transmission rate determining section 73B determines to lower the transmission rate by one step.

The transmission rate determining section 73B then calculates a video image data compression rate corresponding to the one-step-lower transmission rate (250 [Mbps]) and notifies the CHU 22B of the calculated compression rate so that the CHU 22B transmits again the test video image data at the one-step-lower transmission rate.

The transmission rate determining section 73B measures the transmission delay and jitter of the test video image data transmitted again from the CHU 22B and repeatedly carries out the processes described above to lower the transmission rate by one step at a time until the transmission delay and jitter become smaller than or equal to the thresholds.

In the case of the CHU 22B-CCU 23B pair, to which the intermediate priority has been given when the transmission delay and jitter measured for five seconds are greater than the thresholds, the transmission delay and jitter are measured again for five seconds after ten seconds has elapsed. When the transmission delay and jitter measured again are still greater than the thresholds, the transmission rate is lowered by one step. That is, in the case of the CHU 22B-CCU 23B pair, to which the intermediate has been given, when the transmission delay and jitter are greater than the thresholds, the transmission rate is lowered by one step every twenty seconds.

On the other hand, when the transmission delay and jitter of the received test video image data are greater than the thresholds, the transmission rate determining section 73A in the CCU 23A, to which the "highest priority" has been given, waits twenty seconds or any other suitable period and measures the transmission delay and jitter of the test video image data again for five seconds.

The transmission rate determining section 73A compares the transmission delay and jitter measured again with the thresholds. When the transmission delay and jitter are still greater than the thresholds, the transmission rate determining section 73A determines to lower the transmission rate by one step.

The transmission rate determining section 73A then calculates a video image data compression rate corresponding to the one-step-lower transmission rate (250 [Mbps]) and notifies the CHU 22A of the calculated compression rate so that the CHU 22A transmits again the test video image data at the one-step-lower transmission rate.

The transmission rate determining section 73A measures the transmission delay and jitter of the test video image data transmitted again from the CHU 22A and repeatedly carries out the processes described above to lower the transmission rate by one step at a time until the transmission delay and jitter become smaller than or equal to the thresholds.

In the ease of the CHU 22A-CCU 23A pair, to which the highest priority has been given, when the transmission delay and jitter measured for five seconds are greater than the thresholds, the transmission delay and jitter are measured again for five seconds after twenty seconds has elapsed. When the transmission delay and jitter measured again are still greater than the thresholds, the transmission rate is lowered by one step. That is, in the case of the CHU 22A-CCU 23A pair, to which the highest priority has been given, when the transmission delay and jitter are greater than the thresholds, the transmission rate is lowered by one step every thirty seconds.

As described above, in the camera system 20, the transmission rates in the CHU 22-CCU 23 pairs are so determined independently and separately that the sum of the transmission rates in the CHU 22-CCU 23 pairs is not higher than the acceptable throughput of the asynchronous communication network 27.

In this process, in the camera system 20, the transmission rates are so determined that a CHU 22-CCU 23 pair to which a higher priority has been given in accordance with the priorities having been stored in advance in the master dongle 31 and the slave dongle 32 can transmit video image data at a higher transmission rate.

When measured transmission delay and jitter are smaller than the thresholds, the transmission rate determining section 73 in a CCU 23 calculates a compression rate corresponding to the transmission rate at the time of measurement and notifies the connection counterpart CHU 22 of the calculated compression rate. The CHU 22 sets the encoding section 45$a$ to compression-encode video image data at the compression rate determined by the transmission rate determining section 73.

[2-4. Phase Synchronization and Buffer Level Determining Process]

A phase synchronization and buffer size determining process will next be described. The phase synchronization and buffer size determining process is carried out after the system clock synchronization between each CHU 22 and the connection counterpart CCU 23 is established and may be carried out simultaneously with or after the transmission rate determining process described above.

The video switcher 24 selects video image data from those supplied from the CCUs 23 in accordance, for example, with user's selection and outputs the selected video image data. In the camera system 20, the video image data sent from the CCUs 23 therefore need to be synchronized with one another so that no disturbance will be observed between video images switched by the video switcher 24. The CCUs 23 therefore need to send the video switcher 24 video image data in synchronization with one another.

In the camera system 20, however, since the CHUs 22 transmit video image data to the CCUs 23 over the asynchronous communication network 27, the communication paths along which the video image data are transmitted are not fixed but conceivably change depending on the situations.

On the other hand, the camera system 20 is, in consideration of increasing the degree of freedom of the configuration thereof, desirably so configured that LAN cables or any other suitable asynchronous communication network, switching hub, a router, and other apparatus can be flexibly replaced.

Moreover, in the camera system 20, since bandwidth limitation imposed by the asynchronous communication network 27 typically requires the CHUs 22 to compression-encode video image data and CCUs 23 to decode the encoded video image data, it is necessary to consider the delay produced in the encoding and decoding-related processes.

Further, in the camera system 20, since CHUs 22 encrypt video image data to ensure confidentiality, it is also necessary to consider the delay produced in the encryption process.

As described above, in the camera system 20, it is typically difficult to synchronize video image data with one another among the CHU 22-CCU 23 pairs. To address the problem, in the camera system 20, video image data are synchronized with one another among the CHU 22-CCU 23 pairs by carrying out the phase synchronization and buffer size determining process.

Specifically, the delay determining section 74 in a CCU 23 sends the CNU 26 the communication delay measured by the synchronization establishing section 72 in the system clock synchronization process.

Now, the communication delay produced in a single CHU 22-CCU 23 pair is used as a reference. It is conceivable that the communication delay produced in the other CHU 22-CCU 23 pairs is shorter or longer than the reference communication delay.

A description will be made on the following assumption: Communication delay Tb produced in the CHU 22A-CCU 23A pair is used as a reference. Communication delay Ts produced in the CHU 22B-CCU 23B pair is shorter than the communication delay Tb, and communication delay T1 produced in the CHU 22C-CCU 23C pair is longer than the communication delay Tb.

Further, in the following description, the delay determining sections 63 in the CHU 22A, 22B, and 22C are called delay determining sections 63A, 63B, and 63C, respectively, and the buffers 46 in the CHU 22A, 22B, and 22C are called buffers 46A, 46B, and 46C, respectively, for ease of description. The delay determining sections 74 in the CCU 23A, 23B, and 23C are called delay determining sections 74A, 74B, and 74C, respectively.

Figure 9:
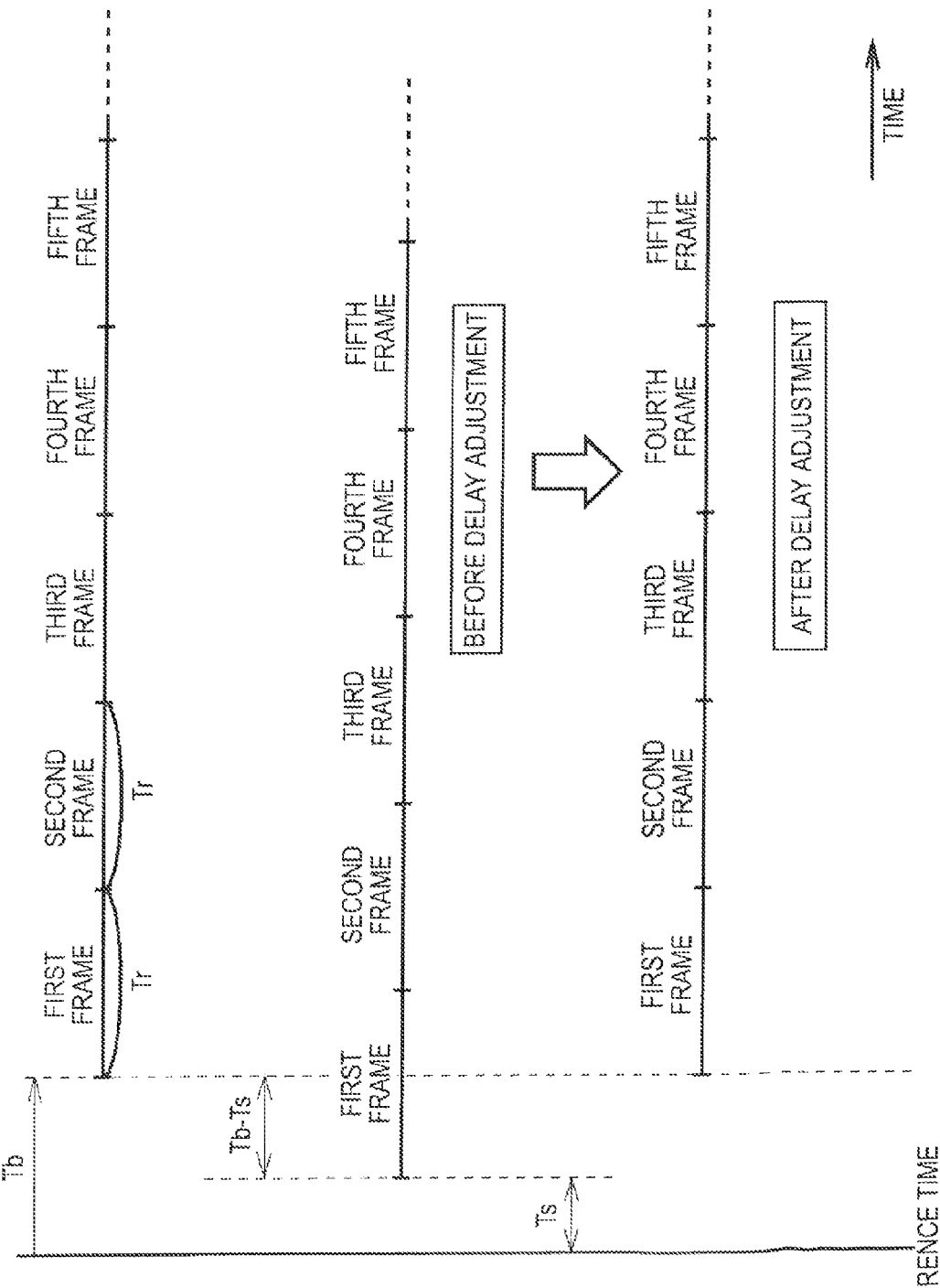
FIGS. 9A to 9C are schematic diagrams showing frame synchronization performed when communication delay produced in a reference CHU-CCU pair is longer than communication delay produced in another CHU-CCU pair.
Figure 10:
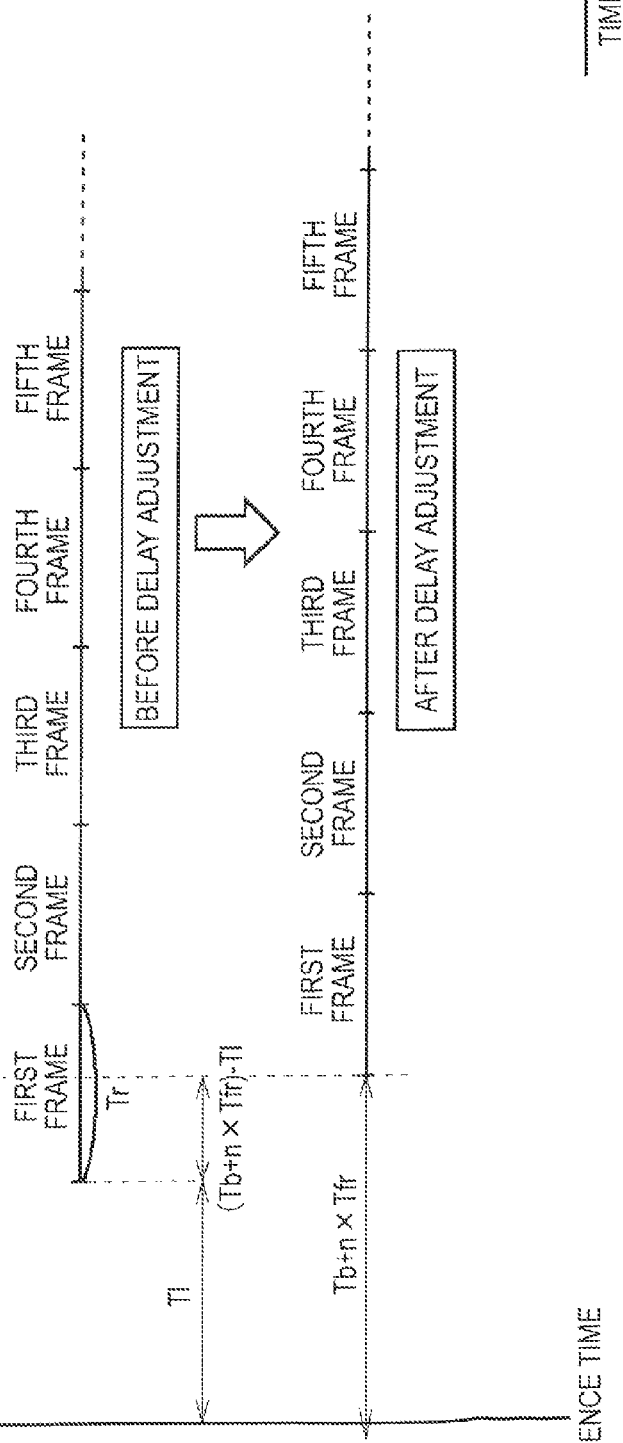
FIGS. 10A to 10C are schematic diagrams showing frame synchronization performed when the communication delay produced in the reference CHU-CCU pair is shorter than communication delay produced in another CHU-CCU pair.

In the reference CHU 22A-CCU 23A pair, video image data (formed of first to fifth frames and so on) transmitted from the CHU 22A to the CCU 23A is delayed by the communication delay Tb with respect to a predetermined reference time, as shown in FIGS. 9A and 10A.

On the other hand, in the CHU 22B-CCU 23B pair, video image data (formed of first to fifth frames and so on) transmitted from the CHU 22B to the CCU 23B is delayed by the communication delay Ts, which is shorter than the communication delay Tb, with respect to the reference time, as shown in FIG. 9B.

The CNU 26, when it judges that the communication delay Ts produced in the CHU 22B-CCU 23B pair is shorter than the communication delay Tb produced in the reference CHU 22A-CCU 23A pair, calculates the difference in delay (Tb−Ts) by subtracting the communication delay Ts from the communication delay Tb.

The CNU 26 then notifies the CCU 23B of the calculated delay difference (Tb−Ts). The delay determining section 74 in the CCU 23B then calculates the size of the buffer 46B that temporarily stores the amount of data corresponding to the delay difference (Tb−Ts) based on the delay difference (Tb−Ts) and the transmission rate at which video image data is transmitted from the CHU 22B.

The delay determining section 74B notifies the CHU 22B of the calculated buffer size. The delay determining section 63B in the CHU 22B then sets the buffer 46B to have the notified buffer size.

In this way, in the CHU 22B-CCU 23B pair, the CHU 22B stores video image data corresponding to the delay difference (Tb−Ts) in the buffer 46B to delay the video image data and then transmits the buffered video image data to the CCU 23B.

In the CHU 22B-CCU 23B pair, the video image data transmitted from the CHU 22B to the CCU 23B is therefore delayed by the communication delay Tb with respect to the reference time and reaches the CCU 23B at the same tine as the video image data in the CHU 22A-CCU 23A pair, as shown in FIG. 9C.

Since the delay of the video image data in the CHU 22A-CCU 23A pair is equal to the delay of the video image data in the CHU 22B-CCU 23B pair, the video image data supplied from the CCU 23A and the video image data supplied from the CCU 23B are synchronized with each other on a frame basis and inputted to the video switcher 24. In this way, no disturbance will be observed between video images switched by the video switcher 24.

On the other hand, in the CHU 22C-CCU 23C pair, video image data (formed of first to fifth frames and so on) transmitted from the CHU 22C to the CCU 23C is delayed by the communication delay T1, which is longer than the communication delay Tb, with respect to the reference time, as shown in FIG. 10B.

The CNU 26, when it judges that the communication delay T1 produced in the CHU 22C-CCU 23C pair is longer than the communication delay Tb produced in the reference CHU 22A-CCU 23A pair, calculates the smallest n that satisfies (Tb+n×Tfr)>T1. In the equation, Tfr represents a one-frame-length period and n is an integer.

The CNU 26 then calculates the delay difference ((Tb+n×Tfr)−T1) by using the calculated n and notifies the CCU 23C of the calculated delay difference ((Tb+n×Tfr)−T1).

The delay determining section 74C in the CCU 23C, when it is notified of the delay difference ((Tb+n×Tfr)−T1), calculates the size of the buffer 46C that temporarily stores the amount of data corresponding to the delay difference ((Tb+n×Tfr)−T1) based on the delay difference ((Tb+n×Tfr)−T1) and the transmission rate at which video image data is transmitted from the CHU 22C.

The delay determining section 74C notifies the CHU 22C of the calculated buffer size. The delay determining section 74C further notifies the CHU 22C and the video switcher 24 that the video image data sent from he CCU 23C is delayed by n frames with respect to the video image data sent, from the CCU 23A so that the user is notified of the fact.

The delay determining section 63C in the CHU 22C, when it is notified of the buffer size from the CCU 23C, sets the buffer 46C to have the notified buffer size.

In this way, in the CHU 22C-CCU 23C pair, the CHU 22C stores video image data corresponding to the delay difference ((Tb+n×Tfr)−T1) in the buffer 46C to delay the video image data and then transmits the buffered video image data to the CCU 23C.

In the CHU 22C-CCU 23C pair, the video image data transmitted from the CHU 22C to the CCU 23C is therefore delayed by the period corresponding to n frames and the communication delay Tb with respect to the video image data transmitted through the reference CHU 22A-CCU 23A pair and reaches the CCU 23B, as shown in FIG. 10C.

That is, the video image data that reaches the CCU 23C is delayed by n frames with respect to the video image data that reaches the CCU 23A.

Although the video image data transmitted from the CCU 23C is delayed by n frames with respect to the video image data supplied from the CCU 23A and inputted to the video switcher 24, the simultaneously inputted video image data are equal to each other in phase on a frame basis. In this way, no disturbance will be observed between video images switched by the video switcher 24.

In the camera system 20, the connection environment setting process is then terminated. After the connection environment setting process is terminated, the CHUs 22 compression-encode video image data captured with the image capturing section 44 in the encoding sections 45a at the compression rates determined in the transmission rate determining process and then encrypt the encoded video image data in the encrypting sections 45b. The CHUs 22 then temporarily store the encrypted video image data in the buffers 46 having the size determined in the phase synchronization and buffer size determining process and then transmit the buffered video image data to the connection counterpart CCUs 23.

The CCUs 23 decrypt the encrypted video image data supplied from the connection counterpart CHUs 22, decode the encoded video image data, and output the resultant video image data to the video switcher 24. The camera system 20 thus starts transmitting video image data.

[3. Procedure of Connection Environment Setting Process]

Figure 12:
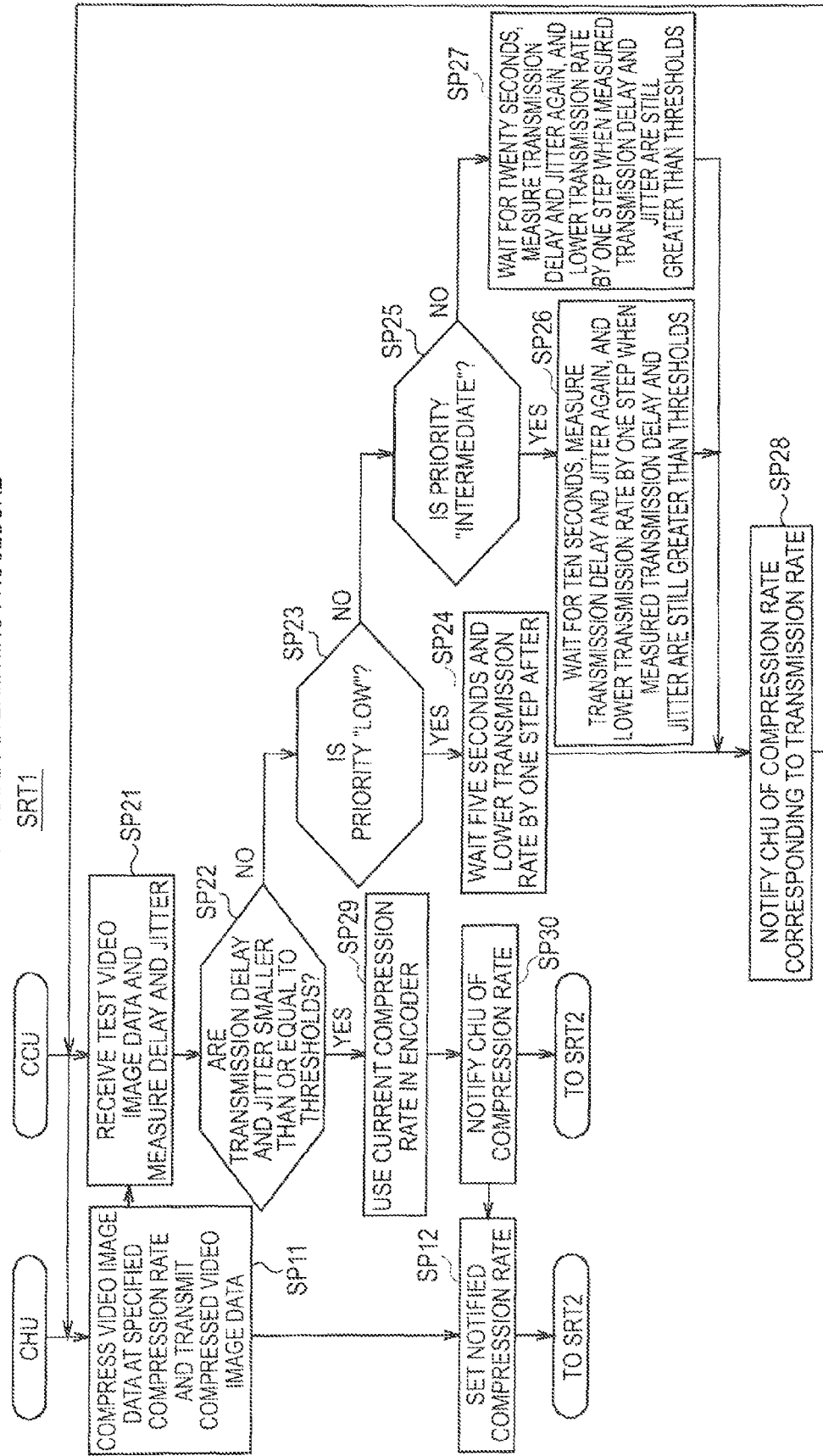
FIG. 12 is a sequence chart showing a transmission rate determining procedure.
Figure 13:
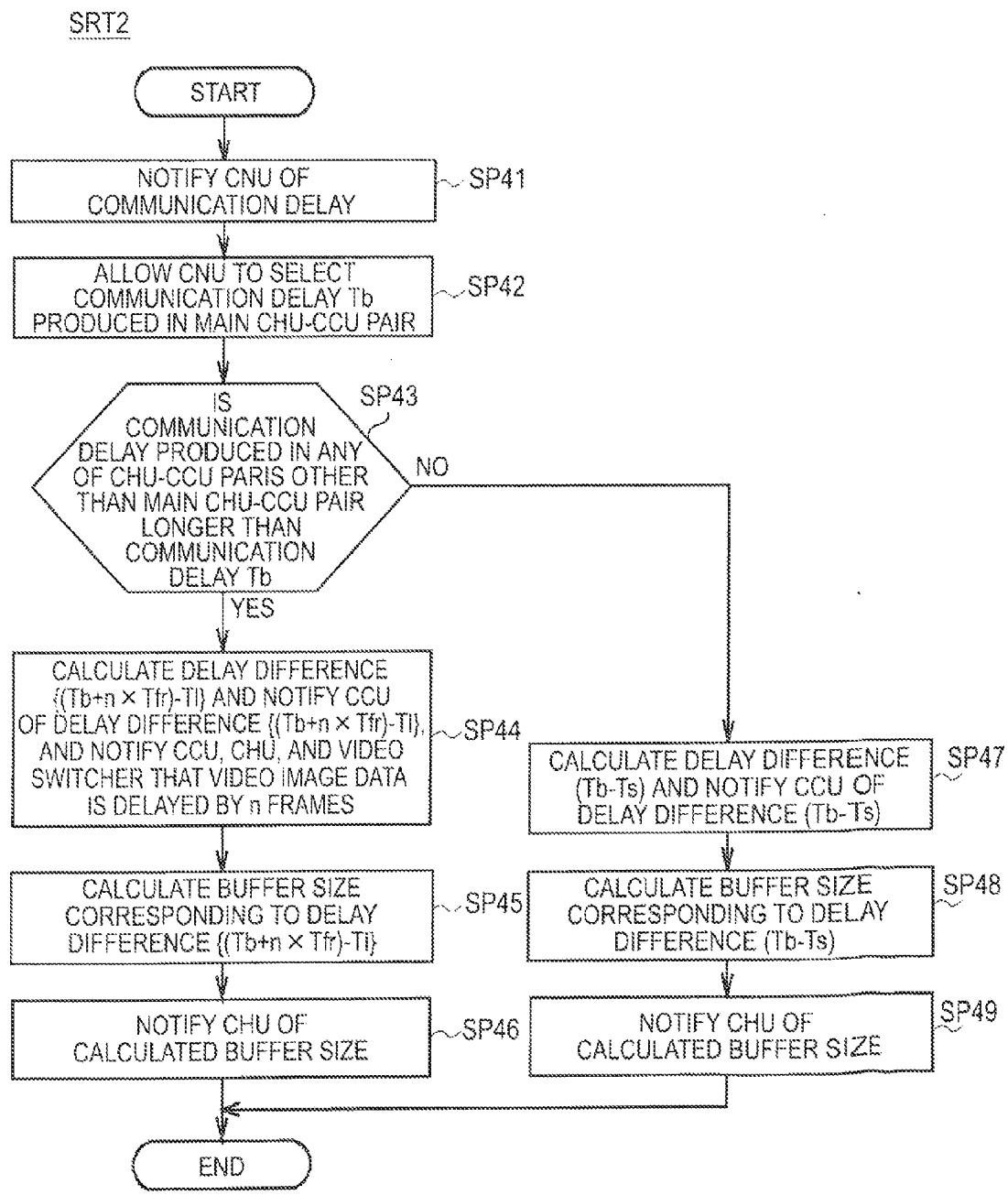
FIG. 13 is a flowchart showing a phase synchronization and buffer size determining procedure.

The procedure of the connection environment setting process described above will next be described with reference to the flowcharts and the sequence charts shown in FIGS. 11 to 13.

Figure 11:
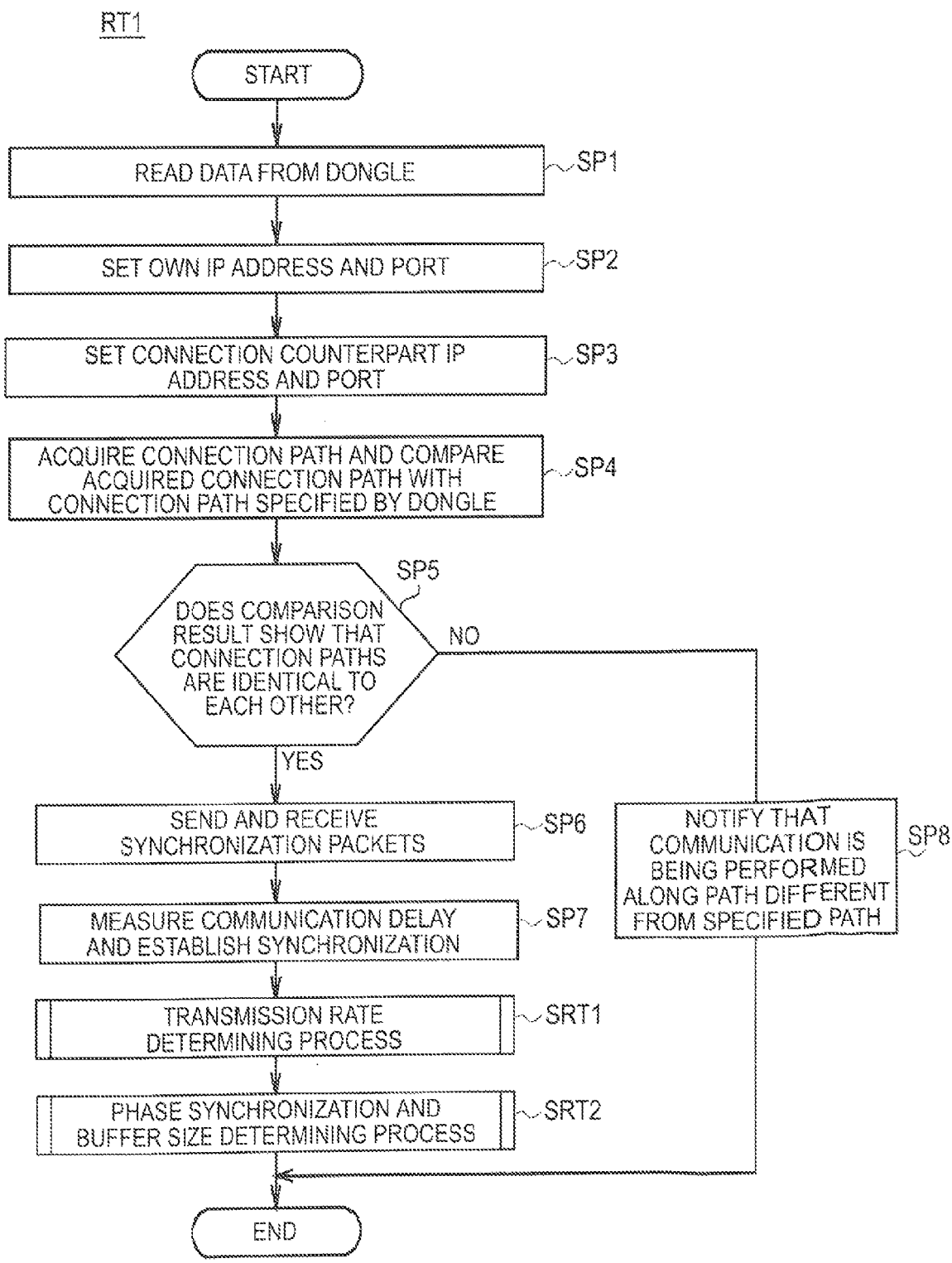
FIG. 11 is a flowchart showing a connection environment setting procedure.

When the camera system 20 is powered or undergoes system reset, the start step transitions to the following step SP1 in the flowchart RT1 shown in FIG. 11.

In step SP1, the CPU 41 in each CHU 22 reads the data stored in the master dongle 31 attached to the USB interface 48 of the CHU 22, and the control proceeds to the following step SP2. In the step SP1, the CPU 51 in each CCU 23 also reads the data stored in the slave dongle 32 attached to the USB interface 57 of the CCU 23, and the control proceeds to the following step SP2.

In step SP2, the CPU 41 in each CHU 22 and the CPU 51 in each CCU 23 set own IP addresses and ports to be used in communication based on the data read from the master dongle 31 and the slave dongle 32. The control then proceeds to the following step SP3.

In step SP3, the CPU 41 in each CHU 22 and the CPU 51 in each CCU 23 set connection counterpart IP addresses and ports to be used in communication based on the data read from the master dongle 31 and the slave dongle 32. The control then proceeds to the following step SP4.

In step SP4, the CPU 41 in each CHU 22 and the CPU 51 in each CCU 23 start connection with the connection counterparts over the asynchronous communication network 27 and search connection paths to the connection counterparts in the asynchronous communication network 27. The CPU 41 in each CHU 22 and the CPU 51 in each CCU 23 compare the connection paths stored in the master dongle 31 and the slave dongle 32 with the searched connection paths, and the control proceeds to the following step SP5.

In step SP5, the CPU 41 in each CHU 22 and the CPU 51 in each CCU 23 judge whether or not the searched connection paths are identical to the connection paths stored in the master dongle 31 and the slave dongle 32.

When the judgment shows that the connection paths differ from each other, the control proceeds to the following step SP58 and the CPU 41 in each CHU 22 and the CPU 51 in each CCU 23 notify the user that the connection paths differ from each other and terminate the procedure.

On the other hand, when the judgment shows that the connection paths are identical to each other, the control proceeds to the following step SP6 and the CPU 41 in each CHU 22 and the CPU 51 in each CCU 23 send and receive synchronization packets. The control then proceeds to the following step SP7.

In step SP7, the CPU 51 in each CCU 23 measures the communication delay based on the result of the transmission and reception of the synchronization packets and establishes system clock synchronization between the CCU 23 and the connection counterpart CHU 22. The control then proceeds to the following subroutine SRT1.

In subroutine SRT1 (FIG. 12) the CPU 41 in each CHU 22 transmits test video image data to the connection counterpart CCU 23 in step SP11. The test video image data is obtained by compression-encoding and encrypting video image data at a compression rate corresponding to the transmission rate stored in the master dongle 31. The control then proceeds to the following step SP12.

On the other hand, the CPU 51 in each CCU 23 measures in step SP21 transmission delay and jitter of the test video image data transmitted from the connection counterpart CHU 22 five seconds. The control then proceeds to the following step SP22.

In step SP22, the CPU 51 in each CCU 23 judges whether or not the transmission delay and jitter measured in step SP21 are smaller than or equal to thresholds. When the judgment shows a negative result, which means that the sum of the transmission rates in the CHU 22-CCU 23 pairs connected via the asynchronous communication network 27 is greater than the acceptable throughput thereof, the CPU 51 carries out the process in step SP23.

In step SP23, the CPU 51 in each CCU 23 judges whether or not the priority stored in the slave dongle 32 is "low." When the priority is judged to be "low," the control proceeds to step SP24, otherwise the control proceeds to step SP25.

In step SP24, the CPU 51 in the CCU 23 to which the "low" priority has given measures the transmission delay and jitter, waits five seconds, and then determines to lower the transmission rate by one step. The control then proceeds to the following step SP28.

On the other hand, the CPU 51 in each of the CCUs 23 to which the "low" priority has not been given judges in step SP25 whether or not the priority stored in the slave dongle 32 is "intermediate." The CPU 51 in the CCU 23 having been judged to have the "intermediate" priority carries out the process in step SP26, and the CPU 51 in the CCU 23 having been judged to have the "high" priority carries out the process in step SP27.

In step SP26, the CPU 51 in the CCU 23 to which the "intermediate" priority has been given measures the transmission delay and jitter, waits ten seconds, and then measures again the transmission delay and jitter of the test video image data for five seconds.

When the transmission delay and jitter measured again are greater than the thresholds, the CPU 51 judges that the amount of data being over the asynchronous communication network 27 is still greater than the acceptable throughput thereof and determines to lower the transmission rate by one step. The control then proceeds to the following step SP28.

On the other hand, the CPU 51 in the CCU 23 to which the "high" priority has been given and a negative result has been given in step SP25 measures the transmission delay and jitter, waits twenty seconds, and then measures again the transmission delay and jitter of the test video image data for five seconds.

When the transmission delay and jitter measured again are greater than the thresholds, the CPU 51 judges that the amount of data being sent over the asynchronous communication network 27 is still greater than the acceptable throughput thereof and determines to lower the transmission rate by one step. The control then proceeds to the following step SP28.

When the CPU 51 in any of the CCUs 23 has determined lower the transmission rate by one step in step SP24, 26, 27, the CPU 51 notifies in step SP28 the connection counterpart CHU 22 of a compression rate corresponding to the lowered transmission rate. The control then returns to step SP21. In this case, the CPU 41 in each CHU 22 compression-encodes the video image data at the notified compression rate and transmits the resultant video image data to the connection counterpart CCU 23 in step SP11.

On the other hand, when the judgment shows a positive result in step S22, it means that the sum of the transmission rates at which video image data are transmitted from the CHUs 22 to the CCUs 23 connected via the asynchronous communication network 27 is smaller than or equal to the acceptable throughput thereof.

In this case, the control proceeds to step SP29, and the CPU 51 in each CCU 23 uses the current compression rate as the compression rate used in the encoder. The control then proceeds to the following step SP30. In step SP30, the CPU 51 in each CCU 23 notifies the connection counterpart CHU 22 of the compression rate determined in step SP29 and terminates subroutine SRT1. The control then proceeds to the following subroutine SRT2 (FIG. 13).

On the other hand, the CPU 41 in each CHU 22 sets the compression encoding section 45a to operate at the notified compression rate so that the video image data is compressed at the compression rate notified from the connection counterpart CCU 23. The subroutine SRT1 is then terminated, and the control proceeds to the following subroutine SRT2.

In subroutine SRT2, the CPU 51 in each CCU 23 notifies in step SP41 the CNU 26 of the communication delay measured in step SP7, and the control proceeds to the following step SP42.

In step SP42, the CNU 26 selects the communication delay Tb produced in a single CHU 22-CCU 23 pair as a reference. The control then proceeds to the following step SP43.

In step SP43, the CNU 26 judges whether or not the communication delay produced in any of the CHU 22-CCU 23 pairs other than the reference CHU 22-CCU 23 pair is greater than the communication delay Tb produced in the reference CPU 22-CCU 23 pair.

When the CNU 26 judges that communication delay T1 produced in a predetermined CHU 22-CCU 23 pair is longer than the communication delay Tb produced in the reference CHU 22-CCU 23 pair, the control proceeds to the following step SP44.

In step SP44, the CNU 26 calculates the delay difference $((Tb+n \times Tfr)-T1)$ under the conditions that $(Tb+n \times Tfr) > T1$ and n is the smallest integer, and the CNU 26 notifies the delay difference $((Tb+n \times Tfr)-T1)$ to the CCU 23 having been judged to produce communication delay longer than the communication delay Tb.

The CNU 26 further notifies the CHUs 22, the CCUs 23, and the video switcher 24 that the video image data transmitted through the CHU 22-CCU 23 pair having been judged to produce communication delay longer than the communication delay Tb is delayed by n frames. The control then proceeds to the following step SP45.

In step SP45, the CPU 51 in the CCU 23 having been judged to produce communication delay longer than the communication delay Tb calculates the amount of data corresponding to the delay difference $((Tb+n \times Tfr)-T1)$ so that the size of the buffer 46 in the connection counterpart CHU 22 is set to have that amount of data. The control then proceeds to the following step SP46.

In step SP46, the CPU 51 in the CCU 23 having been judged to produce communication delay longer than the communication delay Tb notifies the connection counterpart CHU 22 of the calculated buffer size so that the buffer 46 has the calculated buffer size. The control then proceeds to the following step, where the procedure is terminated.

On the other hand, when the CNU 26 judges in step SP43 that communication delay Ts produced in a predetermined CHU 22-CCU 23 pair is shorter than the communication delay Tb produced in the reference CHU 22-CCU 23 pair, the control proceeds to the following step SP47.

In step SP47, the CNU 26 calculates the delay difference (Tb−Ts) and notifies the delay difference (Tb−Ts) to the CCU 23 having been judged to produce communication delay shorter than the communication delay Tb. The control then proceeds to the following step SP48.

In step SP48, the CPU 51 in the CCU 23 having been judged to produce communication delay shorter than the communication delay Tb calculates the amount of data corresponding to the delay difference (Tb−Ts) so that the size of the buffer 46 in the connection counterpart CHU 22 is set to have that amount of data. The control then proceeds to the following step SP49.

In step SP49, the CPU 51 in the CCU 23 having been judged to produce communication delay shorter than the communication delay Tb notifies the connection counterpart CHU 22 of the calculated buffer size so that the buffer 46 has the calculated buffer size. The control then proceeds to the following step, where the procedure is terminated.

[4. Actions and Advantageous Effects]

When the thus configured camera system 20 is powered or undergoes system reset, the CHUs 22 and the CCUs 23 set own IP addresses, connection counterpart IP addresses, and ports based on the data stored in the master dongles 31 and the slave dongles 32 attached to the CHUs 22 and the CCUs 23.

The CCUs 23 establish the system clock synchronization with the connection counterpart CHUs 22, receive test video image data transmitted from the CHUs 22 over the same asynchronous communication network 27, and measure transmission delay and jitter.

When the transmission delay and jitter are greater than thresholds, the transmission rates are so determined that a CCU 23 to which a higher priority has been given advance can transmit video image data at a higher transmission rate under the condition that the sum of the transmission rates at which video image data are transmitted over the same asynchronous communication network 27 is not higher than the acceptable throughput thereof.

Each of the CCUs 23 then notifies the connection counterpart CCU 22 of the video image data compression rate according to the thus determined transmission rate so that the CHU 22 compresses video image data at that compression rate and transmits the compressed video image data.

As a result, in the camera system 20, simply attaching the master dongles 31 and the slave dongles 32 to the CHUs 22 and the CCUs 23 allows the CHUs 22 to be connected to the CCU 23 in accordance with the specification stored in the master dongles 31 and the slave dongles 32.

Further, in the camera system 20, each of the CHU 22-CCU 23 pairs can be so set that it is ready to transmit video image data at a transmission rate according to the priority of the CHU 22-CCU 23 pair and within the acceptable throughput of the asynchronous communication network 27.

Moreover, in the camera system 20, simply attaching the master dongles 31 and the slave dongles 32 to CHUs 22 and CCUs 23 different from initially intended ones allows the settings of the CHUs 22 and the CCUs 23 to be changed in accordance with the specification stored in the master dongles 31 and the slave dongles 12 as if cables are reconfigured.

When the transmission delay and jitter are greater than thresholds in the transmission rate determining process, a CCU 23 to which a slave dongle 32 that stores a higher priority is configured to wait a longer period and then lower the transmission rate.

In the camera system 20, since each of the CCUs 23 thus determines the transmission rate independently and separately, the transmission rate is so determined that a CHU 22-CCU 23 pair to which a higher priority has been given can transmit video image data at a transmission rate lowered by a smaller amount.

In the camera system 20, a CHU 22-CCU 23 pair to which a higher priority has been given can therefore transmit video image data of higher image quality at a transmission rate within the acceptable throughput of the asynchronous communication network 27.

According to the configuration described above, when the transmission delay and jitter of video image data are greater than thresholds, a higher transmission rate can be set when a higher priority is given in advance under the condition that the sum of the transmission rates at which the video image data are transmitted over the asynchronous communication network 27 is not higher than the acceptable throughput thereof. In this way, an optimum connection environment can be set for all the CHUs 22 and CCUs 23 that transmit video image data over the asynchronous communication network 27.

<2. Other Embodiments>

The above embodiment has been described with reference to the case where each of the master dongles 31 and slave dongles 32 is a USB-compliant memory. The present disclosure is not limited thereto but may be so configured that each of the master and slave dongles is formed of a memory card or a recording medium with a noncontact interface. In this case, the CHUs 22 and the CCUs 23 are provided with interfaces that accept these master and slave dongles.

The above embodiment has been described with reference to the case where the transmission delay and jitter of test video image data transmitted from each CHU 22 are measured and the transmission rate is determined based on the measured transmission delay and jitter. The present disclosure is not limited thereto but may be so configured that only the transmission delay is measured and the transmission rate is determined based on the measured transmission delay. Alternatively, for example, a packet loss and a transfer error rate associated with test video image data may also be measured, and the transmission rate may be determined by using these pieces of additional information.

The above embodiment has been described with reference to the case where data other than those stored in advance is not further written in the maser dongles 31 or the slave dongles 32. The present disclosure is not a an ted thereto but may be so configured that the transmission rate determined for each CHU 22-CCU 23 pair is stored in the master dongle 31 and the slave dongle 32.

In this way, in the camera system 20, it is not necessary to carry out the compression rate determining process in a second and the following settings, but video image data can be so transmitted that the sum of the compression rates at which the video image data are transmitted from the CHUs 22 to the CCUs 23 is not higher than the acceptable throughput of the asynchronous communication network 27. The connection setting period can therefore be shortened in a second and the following settings. When the number of CHUs 22 and CCUs 23 in the camera system 20 increased or decreased, however, the transmission rate determining process needs to be carried out again to determine the transmission rates.

The above embodiment has been described with reference to the case where the buffer 46 is provided in each CHU 22. The present disclosure is not limited thereto but may be so configured that a buffer may alternatively be provided in each CCU 23. In this case, the buffer is provided downstream of the decoder 55. The CPU 51 in the CCU 23 sets the buffer provided downstream of the decoder 55 to have the buffer size determined in the phase synchronization and buffer size determining process.

The above embodiment has been described with reference to the case where the CNU 26 calculates the delay difference in the phase synchronization and buffer size determining process. The present disclosure is not limited thereto but may be so configured that a CCU 23 set as a main CCU 23, for example, calculates the delay difference. In this case, the CCU 23 set as a main CCU 23 is notified of communication delay measured by the other CCUs 23 and calculates the delay difference based on the measured communication delay.

The above embodiment has been described with reference to the case where the CHUs 22 are connected to the CCUs 23 via the asynchronous communication network 27, which is Ethernet®/IP. The present disclosure is not limited thereto but may be so configured that the CHUs 22 are connected to the CCUs 23 via any other asynchronous communication network or a synchronous communication network.

Figure 14:
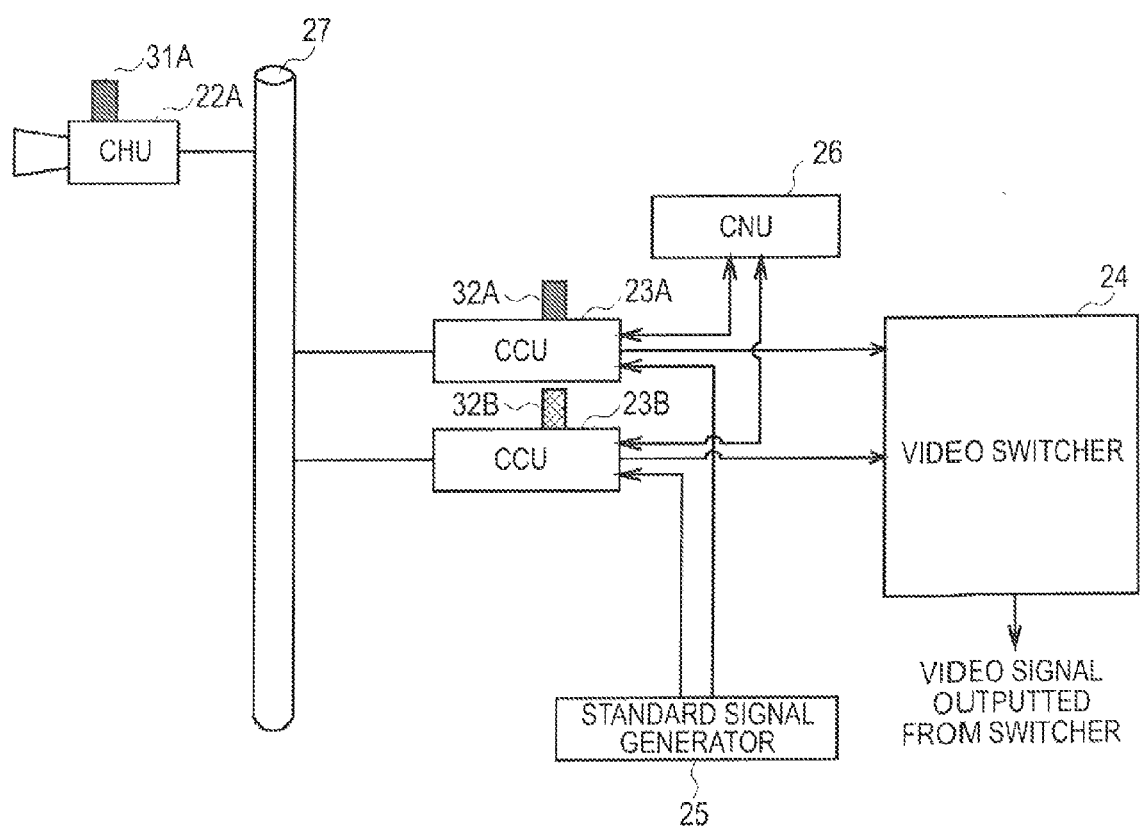
FIG. 14 is a schematic diagram showing a camera system in another embodiment.

The above embodiment has been described with reference to the case where the CHUs 22 are connected to the CCUs 23 in a one-to-one relationship via the asynchronous communication network 27. The present disclosure is not limited thereto but may be so configured that a single CHU 22 is connected to a plurality of CCUs 23 via the asynchronous communication network 27 in a unicast or multicast connection form as shown, for example, in FIG. 14. In this case, for example, the IP addresses of the plurality of CCUs 23 as the connection counterparts may be stored in the master dongles 31. Alternatively, a broadcast IF may be specified as a connection counterpart, and video image data may be transmitted to the plurality of CCUs 32 by transmitting the video image data to the broadcast IP address.

As another example, a plurality of CHUs 22 may be connected to a single CCU 23 via the asynchronous communication network 27. That is, the number of CHUs 22 and CCUs 23 and the connection therebetween can be set as appropriate.

The above embodiment has been described with reference to the case where the transmission rate determining process is carried out by measuring the transmission delay and jitter, waiting 5, 10, or 20 seconds in accordance with the priority, and lowering the transmission rate or measuring the transmission delay and jitter again. The present disclosure is not limited thereto but may be so configured that the waiting period is set as appropriate under the conditions that a higher priority allows a higher transmission rate and a longer waiting time.

The above embodiment has been described with reference to the case where when the transmission delay and jitter are greater than thresholds, a CCU 23 to which the "low" priority has been given waits five second and then lowers the transmission rate by one step. The present disclosure is not limited thereto but may be so configured that when the transmission delay and jitter are greater than thresholds, the CCU 23 may wait five seconds, measure the transmission delay and jitter again, and lower the transmission rate by one step when the transmission delay and jitter measured again are still greater than the thresholds.

The above embodiment has been described with reference to the case where when the transmission delay and jitter are greater than thresholds, the CCU 23 to which the "intermediate" or "high" priority has been given waits ten or twenty seconds, measures the transmission delay and jitter again, and then lowers the transmission rate by one step when the transmission delay and jitter measured again are still greater than the thresholds. The present disclosure is not limited thereto but may be so configured that when the transmission delay and jitter are greater than the thresholds, the CCU 23 may wait ten or twenty seconds and then immediately lower the transmission rate by one step.

The above embodiment has been described with reference to the case where the priorities are "high," which represents the highest priority, "intermediate, " which represents an intermediate priority, and "low, " which represents the lowest priority. The present disclosure is not limited thereto but may be so configured that the priorities may be numbered in descending order, that is, "1", "2", and so on.

Figure 15:
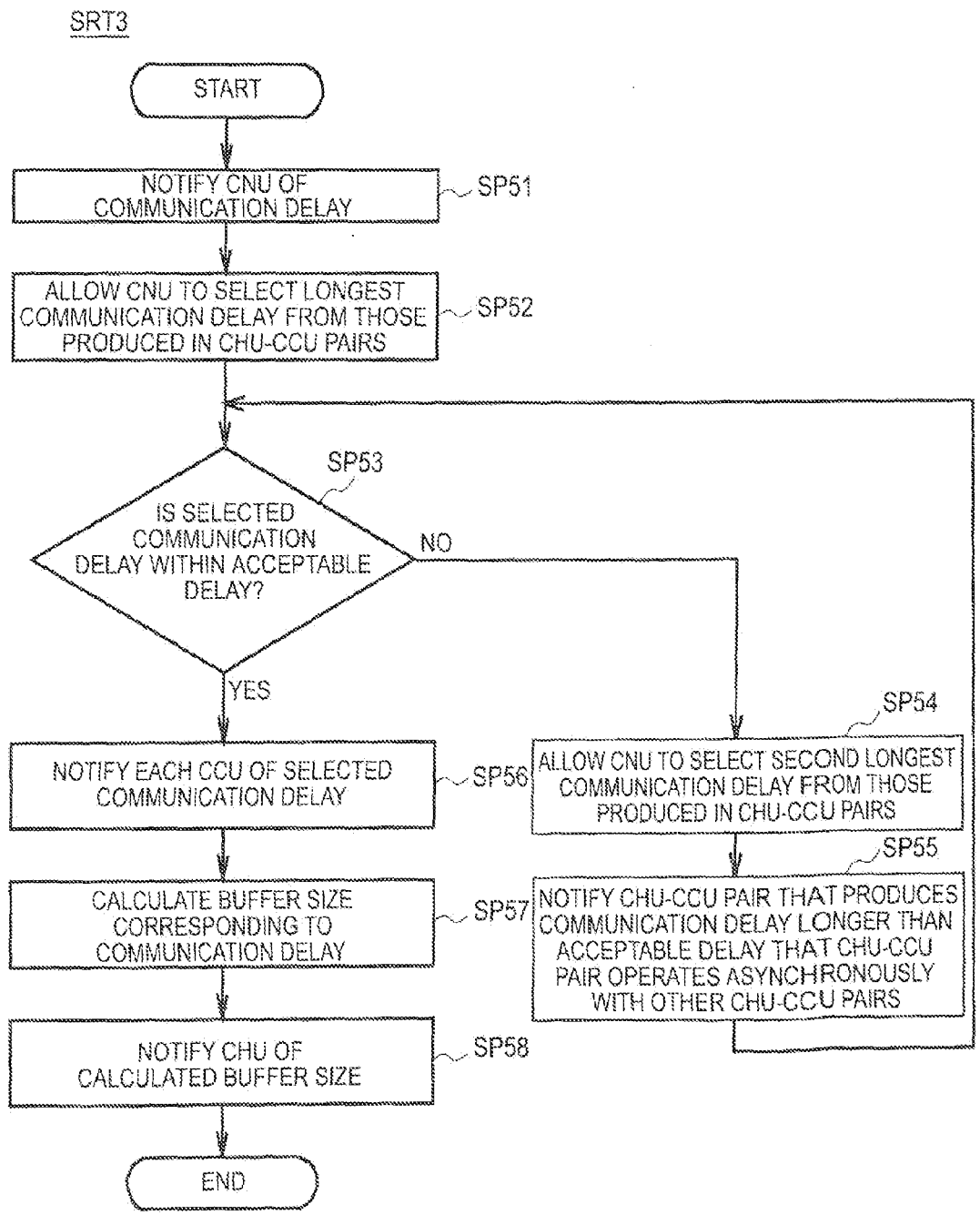
FIG. 15 is a flowchart showing a system delay negotiation procedure in another embodiment.

The above embodiment has been described with reference to the case where the transmission rate determining process and then the phase synchronization and buffer size determining process are carried out to determine the size of each buffer 46 in such a way that the video image data supplied from the CCUs 23 to the video switcher 24 are in phase with one another. The present disclosure is not limited thereto but may be so configured that the phase synchronization and buffer size determining process may be replaced with a system delay negotiation process shown in FIG. 15.

The system delay negotiation process is carried out after the system clock synchronization is established between the CHUs 22 and the CCUs 23 and may be carried out simultaneously with or after the transmission rate determining process.

In the system delay negotiation process, the start step transitions to the following step SP51, and the CPU 51 in each CCU 23 notifies the CNU 26 of the communication delay measured by the synchronization establishing section 72 in the system clock synchronization process. The control then proceeds to the following step SP52.

In step SP52, the CNU 26 selects the longest communication delay from those supplied from the CCUs 23, and the control proceeds to the following step SP53.

In step SP53, the CNU 26 compares the selected communication delay with preset acceptable delay and judges whether or not the communication delay is within the acceptable delay.

When the judgment in step SP53 shows that the communication delay is longer than the acceptable delay, the control proceeds to the following step SP54, where the CNU 26 selects the second longest communication delay from those supplied from the CCUs 23. The control then proceeds to the following step SP55.

In step SP55, the CNU 26 notifies the CHU 22-CCU 23 pair that produces communication delay longer than the acceptable delay period that video images transmitted through the CHU 22-CCU 23 pair are not synchronized with video images transmitted through the other CHU 22-CCU 23 pairs or the CHU 22-CCU 23 pair operates asynchronously with the other CHU 22-CCU 23 pairs. The control then returns to step SP53.

The CHU 22-CCU 23 pair having been notified that it operates asynchronously with others CHU 22-CCU 23 pairs, for example, displays on the display of the CHU 22 a message stating that the CHU 22-CCU 23 pair operates asynchronously with the other CHU 22-CCU 23 pairs so that the user is notified of the fact. The CHU 22-CCU 23 pair also notifies the video switcher 24 that it operates asynchronously with the other CHU 22-CCU 23 pairs, and the video switcher 24 displays on its display a message stating the fact so that the user is notified of the fact.

After the control returns to step SP53, the CNU 26 compares the reselected communication delay with the acceptable delay period again and repeatedly executes steps SP53 to SP55 until the selected communication delay becomes shorter than or equal to the acceptable delay period.

On the other hand, when the judgment instep SP53 shows that the communication delay is within the acceptable delay, the control proceeds to step SP56 and the CNU 26 notifies the CCUs 23 of the currently selected communication delay. The control then proceeds to the following step SP57. That is, all the CCUs 23, which produce communication delay shorter than the acceptable delay, are notified of the communication delay produced in the currently selected CHU 22-CCU 23 pair.

In step SP57, the delay determining section 74 in each CCU 23 calculates the difference between the communication delay notified from the CNU 26 and the communication delay measured by the synchronization establishing section 72 in the system clock synchronization process. The delay determining section 74 then calculates the amount of data corresponding to the difference based on the difference and the transmission rate at which the video image data is supplied from the connection counterpart CHU 22 so that the size of buffer 46 is set to have that amount of data. The control then proceeds to the following step SP58.

In step SP58, the delay determining section 74 in the CCU 23 notifies the connection counterpart CHU 22 of the calculated buffer size. The delay determining section 63 in the CHU 22 sets the buffer 46 to have the notified buffer size, and the procedure is terminated.

Each CHU 22 can therefore adjust the timing at which video image data is outputted in accordance with the buffer size by delaying the video image data by the communication delay, which is smaller than or equal to the acceptable delay, initially selected by the CNU 26, and then transmit the video image data to the connection counterpart CCU 23.

In the camera system 20, all the CHU 22-CCU 23 pairs that produce communication delay shorter than or equal to the acceptable delay thus have the same delay. The CCUs 23 therefore supply the video switcher 24 with video image data synchronized with one another, whereby no disturbance will be observed between video images switched by the video switcher 24.

In the system delay negotiation process, the processes carried out by the CNU 26 may alternatively be carried out by the CPU 51 in the CCU 23 having been set as a main CCU 23.

When a buffer is provided in each CCU 23 instead of the buffer in each CHU 22, the CPU 51 in the CCU 23 sets the buffer, which is provided downstream of the decoder 55, to have the buffer size determined in the system delay negotiation process.

The above embodiment has been described with reference to the case where the transmission rate determining section 73 in each CCU 23 determines to lower the transmission rate, calculates a compression rate corresponding to the lowered transmission rate, and notifies he connection counterpart CHU 22 of the calculated compression rate. The present disclosure is not limited thereto but may be so configured that the transmission rate determining section 73 in each CCU 23 determines to lower the transmission rate and notifies the connection counterpart CHU 22 of the lowered transmission rate and the CPU 41 in the CHU 22 calculates a compression rate corresponding to the notified transmission rate.

The above embodiment has been described with reference to the case where the CPUs 41 and the CPUs 51 carry out the variety of processes described above in accordance with programs stored in the ROMs 42 and the ROMs 52. The present disclosure is not limited thereto but may be so configured that the CPUs 41 and the CPUs 51 carry out the variety of processes described above in accordance with programs stored in the master dongles 31 and the slave dongles 32. Alternatively, for example, the CPUs 41 and the CPUs 51 may carry out the variety of processes described above in accordance with programs installed from a recording medium or downloaded over the Internet. Still alternatively, the CPUs 41 and the CPUs 51 may carry out the variety of processes described above in accordance with programs installed through a variety of other routes.

The above embodiment has been described with reference to the case where the image capturing section 44 is provided as an image capturing section; the encoding section 45a is provided as an encoding section; the CPU 41 is provided as a transmitting section; and the transmission rate determining section 73 is provided as a transmission rate determining section. The present disclosure is not limited thereto, but an image capturing section, an encoding section, a transmitting section, and a transmission rate determining section may be provided in a variety of other configurations.

The present disclosure can be used, for example, in a camera system in which a plurality of CHUs transmit video image data to a plurality of CCUs over a single transmission network.

The present disclosure contains subject matter related to that disclosed in Japanese Priority Patent Application JP 2010-144147 filed, in the Japan Patent Office on Jun. 24, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A camera system in which at least one camera head unit is connected to at least one camera control unit that controls the camera head unit via a single transmission network,
    wherein the camera head unit includes
    an image capturing section that acquires image data,
    an encoding section that encodes the image data at a predetermined compression rate, and
    a transmitting section that transmits the encoded image data to the camera control unit at a Mbps transmission rate,
    the camera control unit includes
    a transmission rate determining section that measures delay of test image data transmitted from the camera head unit and determines the Mbps transmission rate at which image data is transmitted from the camera head unit, and
    the transmission rate is determined by reducing the bps transmission rate of the camera head unit if the measured delay exceeds a threshold, said threshold corresponding to a predetermined throughput of said transmission network, and repeatedly measuring the delay of transmitted test data and reducing the transmission rate of the camera head unit until the measured delay is less than said threshold.

2. The camera system according to claim 1, further comprising
    a compression rate determining section that calculates a compression rate at which image data captured with the camera head unit is compressed in accordance with the determined transmission rate and notifies the camera head unit of the calculated compression rate.

3. A non-transitory recording medium used in a camera system in which at least one camera head unit is connected to at least one camera control unit that controls the camera head unit via a single transmission network, the at least one camera head unit exhibiting priorities and a determinable M bps transmission rate,
    wherein the recording medium stores
        identifiers that allow the camera head unit and the camera control unit to identify respective connection counterparts, and
        priorities for determining the Mbps transmission rate at which image data is transmitted from the camera head units, and
    the transmission rate is so determined that when delay of test image data transmitted from a camera head unit to the camera control unit is greater than a threshold, the transmission rate is determined by reducing the Mbps transsmission rate of the camera head unit in steps until the delay is less than said threshold, said threshold corresponding to a predetermined throughput of said transmission network, whereby the sum of the Mbps transmission rates at which image data is transmitted over the transmission network is smaller than or equal to the maximum amount of transmission permitted over the transmission network, and such that the Mbps transmission rate becomes higher in accordance with the priorities of the camera head units.

4. A connection setting method to set Mbps transmission rates of plural camera head units connected to at least one camera control unit via a single transmission network in a camera system, wherein said camera head units are operable to capture image data and exhibit different priorities, said method comprising:
    transmitting test data from said camera head units to at least one camera control unit;
    measuring delay of said test data from a respective camera head units;
    reducing the Mbps transmission rate of the camera head unit having the lowest priority if the measured delay exceeds a threshold, said threshold corresponding to a predetermined throughput of said transmission network;
    repeating, at a first repetition rate, said the steps of transmitting test data, measuring delay and reducing the transmission rate of the camera head unit having the lowest priority;
    reducing the Mbps transmission rate of the camera head unit having a next higher priority if the measured delay still exceeds said threshold;
    repeating, at a second repetition rate, said steps of transmitting said test data, measuring delay and reducing the transmission rate of the camera head unit having the next higher priority, said first repetition rate being greater than said second repetition rate; and
    ceasing the reduction of the Mbps transmission rate of the camera head units when said measured delay is less than said threshold.

5. The connection setting method according to claim 4, further comprising
    calculating a compression rate at which image data captured with a camera head unit is compressed in accordance with the transmission rate of that camera head unit and notifying that camera head unit of the calculated compression rate.

6. The connection setting method according to claim 4, further comprising
    measuring communication delay produced in association with a camera head unit and adjusting the delay of image data based on the communication delay on a frame basis.

7. The connection setting method according to claim 4, further comprising
    notifying a user that a connection path to a camera head unit via the transmission network differs from a preset connection path.

* * * * *